United States Patent [19]

Hergenrother

[11] 3,940,372

[45] Feb. 24, 1976

[54] MODIFIED MOLECULAR WEIGHT OF POLYLACTAMS

[75] Inventor: William L. Hergenrother, Akron, Ohio

[73] Assignee: The Firestone Tire & Rubber Company, Akron, Ohio

[22] Filed: Aug. 12, 1974

[21] Appl. No.: 496,417

[52] U.S. Cl........ 260/78 L; 260/857 G; 260/857 D; 260/858; 260/78 P; 260/78 SC
[51] Int. Cl.² .................. C08G 69/24; C08G 81/00
[58] Field of Search............ 260/78 L, 78 P, 78 SC, 260/857 G, 857 D, 858

[56] References Cited
UNITED STATES PATENTS

| | | | |
|---|---|---|---|
| 3,298,977 | 1/1967 | Robertson et al............. | 260/78 L X |
| 3,470,139 | 9/1969 | Marshall et al. ................... | 260/78 L |
| 3,481,923 | 12/1969 | Naarmann........................ | 260/78 L |
| 3,669,917 | 6/1972 | Ando et al. ...................... | 260/78 L |

OTHER PUBLICATIONS

Cram, D. J., Fundamentals of Carbanion Chemistry, (1965), Academic Press, N.Y., pp. 4–7 and 14–21.

*Primary Examiner*—Lucille M. Phynes

[57] ABSTRACT

Nylons containing modified molecular weights are anionically polymerized from lactams having from 3 to 16 carbon atoms in the presence of hydrocarbon molecular weight control compounds having a $pK_a$ of from about 15 to about 29.

29 Claims, No Drawings

3,940,372

MODIFIED MOLECULAR WEIGHT OF POLYLACTAMS

BACKGROUND OF THE INVENTION

The present invention relates to compounds which modify the molecular weight of polymerized lactams. More specifically, the present invention relates to the use of compounds which allows anionic polymerization of lactams to proceed at a normal rate and yet inhibits coupling and/or chain transfer which generally produce high molecular weight and/or gelled polylactams.

Heretofore, the anionic polymerization of lactams produced polylactams often having much higher molecular weights than that expected from calculations based upon the elements of lactam monomer and anionic initiators. Generally, the much higher molecular weight has been attributed to branching reactions such as between an amide ion and an imide chain end which produce a coupled site. This reaction often resulted in very high molecular weight products and/or gels, especially with longer polymerization time periods and hence altered the rheology of the polylactam. Since the range of molecular weights of polylactams would vary from batch to batch depending upon the amount of branching or coupling, processing problems were often encountered in situations wherever rheology considerations tend to be important such as in fiber making, spinning operations and often in molding.

In an article entitled "Initiated Polymerization of Caprolactam: Molecular Weight Control" by E. H. Mottus, R. N. Hedrick and J. M. Butler, American Chemical Society POlymer Preprints, 9(1) Page 390 (1968), aliphatic, cycloaliphatic and aromatic amines and amides were added to anionically polymerizing lactam systems to react with the potential coupling sites thereby reducing the concentration of such sites sufficiently to prevent the undesirable branching reaction. However, the reaction of amides with the potential coupling sites generally resulted in chain termination and generation of new chains while amines resulted in chain termination. Thus, the overall effect was the production of a polylactam which generally had molecular weights much below the calculated value due to the chainn termination and/or chain transfer reactions. Polymers produced utilizing amine and amide modifiers thus go to a lower conversion and are less viscous.

SUMMARY OF THE INVENTION

Accordingly, it is an object of the present invention to produce polylactams which have modified molecular weights.

It is another object of the present invention to produce polylactams, as above, wherein coupling or branching through active sites on the polylactam during polymerization are prevented.

It is a further object of the present invention to produce polylactams, as above, wherein imide-amide type reactions which result in coupling or branching reactions are prevented.

It is still another object of the present invention to produce polylactams which have molecular weights comparable to expected calculated values, are gel free and have improved processability.

It is yet another object of the present invention to produce rubber-nylon block copolymers free of coupling or branching reactions.

It is yet another object of the present invention to produce polylactams having modified molecular weights comparable to expected values by utilizing hydrocarbons having a $pK_a$ of about 15 to about 29 which will not interfere with polymerization or cause chain transfer reactions.

These and other objects of the present invention, together with the advantages thereof over existing prior art compounds and methods which will become apparent from the following specification are accomplished by the method and compounds hereinafter described and claimed.

In general, nylons having modified molecular weights comprise anionically polymerized lactams having from 3 to 16 carbon atoms and from 0.001 mole percent to 30 mole percent of a hydrocarbon compound lacking any active hydrogen attached to an atom selected from the group consisting of nitrogen, oxygen and sulfur, and having a $pK_a$ of about 15 to about 29.

DESCRIPTION OF THE PREFERRED EMBODIMENTS

According to the concepts of the present invention, polylactams having modified molecular weights are produced. By the term modified molecular weights it is meant that lactams are anionically polymerized to produce a range of molecular weights including an average molecular weight which is comparable or very similar if not the same to the expected values based on calculations of the amount of lactam monomer and initiator or catalyst. This is true regardless of the amount of polymerization time whereas heretofore long polymerizing times such as a few hours or more would generally produce polylactams having a large number of polymers possessing molecular weights as well as an average molcular weight well above the expected calculated value. Generally, the modified molecular weight polylactams of the present invention are produced by utilizing a compound which prevents or inhibits coupling or branching onto the polylactam chain during growth.

The lactams which will undergo anionic polymerization may generally be classified as the lactams which contain at least three carbon atoms in the lactam ring and may be illustrated by the formula:

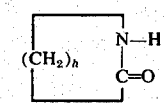

wherein $n$ is an integer of at least 2 and up to 15 and preferably from 5 to 12 with a value of 5 (nylon 6) being highly preferred. Examples of specific lactams include caprolactam and caprylactam. The polymerization of the lactams is generally carried out at a temperature range of from 0°C to 260°C and preferably from about 120°C to about 180°C. The time of the polymerization will, of course, generally vary dependent upon the temperature, the amount of initiator or catalyst as well as upon the amount of monomer. Generally, polymerization times may vary from an hour or less to several hours and even longer.

The molecular weight of the polylactams according to the present invention may generally have any desirable average molecular weight. Thus, polylactams having conventionally utilized average molecular weights may be produced such as an average molecular weight from about 10,000 to about 30,000 which when measured on the basis of relative viscosity will range from about 1.9 to about 3.6. Of course, any range of average molecular weight may be produced such as from about 1,000 to well over 100,000.

Suitable initiators or catalysts for the anionic polymerization of lactams may be any of the metals, which can be in metallic, complex ion or compound form, that are capable of forming lactam salts (for example sodium hydride and caprolactam to form sodium caprolactam). Common examples of such catalysts are the alkali and alkaline earth metals, for example sodium, potassium, lithium, calcium, strontium, barium, magnesium and the like either in metallic form or in other forms such as hydrides, borohydrides and oxides. Desirably, initiators which do not give off water when reacted with lactams are utilized. Another common class of effective initiators are the organo-metallic derivatives of the foregoing metals. Examples of such organo-metallic compounds include lithium, potassium and sodium alkyls such as butyl lithium, ethyl potassium or propyl sodium or the aryl compound of such metals. Moreover, the Grignard reagents are also effective initiators for lactam polymerization.

In general, these initiators are well known to one skilled in the art and include many conventional compounds. A particularly preferred class of compounds is represented by the formula RLi wherein R is a hydrocarbon radical selected from the group of aliphatic, cycloaliphatic and aromatic radicals containing from 1 to 30 carbon atoms per molecule.

As also well known to one skilled in the art, the initiator concentration employed may vary from a very small mole percent, for example well less than 0.01 mole percent to about 10 or 20 mole percent, based upon the lactam monomer. In general, however, the highly preferred initiator concentrations will vary from about 0.1 to about 1 mole percent.

The modified molecular weight polylactams of the present invention are produced by utilizing various hydrocarbon compounds which have been found to allow normal polymerization, will not interfere with conversion and will not cause chain transfer reactions or coupling or branching reactions. These compounds according to the concepts of the present invention may be any hydrocarbon compound which does not contain an active hydrogen attached to a nitrogen, oxygen or sulfur atom such as amines, alcohols, carboxylic acids and mercaptans and have a $pK_a$ value of about 15 to about 29 based upon the McEwen-Streitwieser-Applequist-Dessy Scale, see Cram, "Fundamentals of Carbanion and Chemistry", Academic Press, Pages 15–20, 1965. Since $pK_a$ values will vary from reference to reference, generally the present invention pertains to hydrocarbons such as and having a $pK_a$ value as indicated: fluorene (22.9), 9-phenylfluorene (18.5), acetylene (25), phenylacetylene (18.5), indene (18.5), cyclopentadiene (15) and 1,3,3-triphenylpropene (26.5). Preferred hydrocarbons include fluorene and phenylacetylene.

It is generally thought that the above specific hydrocarbons prevent chain transfers and coupling reactions since their $pK_a$ value lies generally between or about that of the monomer lactam compound and the polymerizing lactam chain. In such a situation, it is postulated that the hydrocarbon compounds of the present invention will occupy the potential coupling, branching or chain transferring site thereby preventing an amide-imide reaction and thus permitting the lactam polymerization to proceed according to the normal expected mechanism. Accordingly, molecular weights are produced comparable to the expected calculated value with resulting expected rheologies of the polymers. Thus, polylactams having desirable molecular weight ranges regardless of polymerization time can be produced and the problem of gelling high or very high molecular weights is eliminated. Since good rheology is obtained, the polylactams can be utilized in situations wherever consistent rheology is important and desirable. Hence, polylactams according to the present invention are desirable for uses in tire cord, monofilament nylon, and generally wherever adding fibers or spinning operations are encountered and good processability properties desired.

The amount of hydrocarbon compound desired may generally range from less than 0.001 mole percent to about 30 mole percent based upon the lactam monomer. A more desirable range is from about 0.005 to about 20 mole percent with a preferred range being about 0.05 mole percent to about 1.0 mole percent. Since the hydrocarbon compounds tend to occupy the potential undesirable reaction sites on the growing polylactam chain such as coupling sites, the amount of desirable hydrocarbon compound can generally be correlated to the amount of initiator. That is, since the amount of initiators generally determines the number of chains, the range of hydrocarbon compound can generally vary from about 0.1 to about 10 or 20 equivalents based upon the mole amount of the initiator. In order to prevent undesirable reactions, a preferred range of hydrocarbon compounds based upon the amount of initiators is from about 0.5 to about 10 or 20 equivalents per mole of initiator. Higher amounts, of course, can be used but are somewhat impractical due to economical considerations. Excess amounts of hydrocarbons are desirable based upon the simple fact that due to the growing chains and volume occupied, an exact number of moles of hydrocarbon compound to the number of moles of initiator will generally not be sufficient to occupy all of the potential reaction sites.

Generally, the hydrocarbon compounds of the present invention which permit the polymerization process to produce molecular weights comparable to the calculated values can be used in any polylactam polymerization including the production of block copolymers such as rubber-nylon block copolymers set forth in a commonly owned United States Patent Application bearing Ser. No. 219,161, now U.S. Pat. No. 3,838,108, which is hereby incorporated by reference with respect to the formation and production of this particular class of block copolymers. That is, once the base portion of a block copolymer containing rubber or other polymers set forth in the above-noted specification is endcapped with a polyisocyanate or a polyisothiocyanate and the lactam polymerization about to be commenced, hydrocarbon compounds according to the present invention may be added to insure that block copolymers having a nylon constituent of an expected calculated value will be produced.

The present invention will be more readily understood by the following examples.

EXAMPLES I AND II

Two identical runs were made with a 1,2-polybutadienepolycaprolactam block copolymer. The lactam polymerization was allowed to proceed five times longer than normal in order to favor the amide-imide coupling or branching reaction which the hydrocarbon compound was to prevent or inhibit. The degree of coupling and/or gellation was measured by means of plasticity. More specifically, the plasticity is the area in $cm^2$ of a 0.500 gram sample pressed at 100°C under a pressure of 2,000psi for 30 seconds. The higher the area the better material flow and thus the lower the molecular weight and/or degree of coupling.

The hydrocarbon utilized was fluorene and was equivalent to the amount of initiator used. The procedure of these two runs is as follows.

To a dry 28 ounce beverage bottle containing a magnetic stirrer was added 500cc of dry tetrahydrofuran (THF) and 40.0 grams of butadiene. After cooling to minus 25°C, 5.1 cc of 1.615 molar butyl lithium (0.25 × $10^{-3}$) moles for impurities and 8 × $10^{-3}$ moles for polymerization (average molecular weight 5,000) was added. After 3 hours at this temperature, a sample gave a 5,000 molecular weight by viscosity (5,300 molecular weight by GPC) and 86% vinyl content. To this was added 6.73 cc of a 1.19 molar toluene diisocyanate solution which gave 25% coupling as measured by GPC. To this was added 80 grams of dry molten caprolactam and 4.0 cc of a 10% solution of phenylbetanaphthylamine (PBNA). At this point 16.3 cc of a 0.507 molar solution of fluorene was then introduced. The bottle was heated with a nitrogen purge to 160°C for 10 hours. This resulted in a copolymer that had a plasticity of $14.8cm^2$ when prepared without any hydrocarbon compound and a plasticity of 52.9cm when prepared with fluorene.

Several additional runs were made with polycaprolactam wherein the anionic catalyst was sodium hydride. The specific hydrocarbons utilized were phenylacetylene, indene, and fluorene. The exact method of preparation of these compounds is as follows.

To a dry 10 ounce beverage bottle was added 0.204 grams of a 59% dispersion of sodium hydride in mineral oil (5 × $10^{-3}$ moles) and 50 grams of dry molten caprolactam. The amount of modifier set forth in Table I was added and the bottle was then heated in a forced air oven to 160°C. Then 0.70 cc of acetyl caprolactam (5 × $10^{-3}$ moles) was added and the bottle was heated at 160°C for 18 hours. The molecular weight obtained for the various samples are set forth in Table I. The various molecular weights were determined as follows. The charged molecular weight was equal to the grams of caprolactam divided by the moles of acetyl caprolactams times a factor of 1.83. This factor is obtained by dividing the viscosity average molecular weight of the polycaprolactam by the number average molecular weight utilizing gel permeation chromatography. The molecular weight found was determined from the formula $V = 4.5 \times 10^{-4} M^{0.792}$ where V is the intrinsic viscosity determined in concentration sulfuric acid solution. The expected molecular weight was calculated by dividing the grams of charged caprolactam minus the grams of water soluble caprolactam by the moles of acetyl caprolactam and multiplying the obtained quotient by 1.83.

TABLE I

| SAMPLE NO. | MOLES OF MODIFIER PER MOLE OF NaH | %H$_2$O SOLUTION | Mol. Wt. × $10^{-3}$ CHARGED | FOUND | EXPECTED |
|---|---|---|---|---|---|
| | With Phenylacetylene | | | | |
| 3 | 0.1 | 0.3 | 18.2 | 21.1 | 18.2 |
| 4 | 0.5 | 0.3 | 18.4 | 19.7 | 18.3 |
| 5 | 1.0 | 0.7 | 18.3 | 17.7 | 18.2 |
| 6 | 1.3 | 3.8 | 18.4 | 18.0 | 17.7 |
| | With Indene | | | | |
| 7 | 0.1 | 1.9 | 18.3 | 21.7 | 18.1 |
| 8 | 0.5 | 5.0 | 18.4 | 17.8 | 17.6 |
| 9 | 1.0 | 89.0 | 18.3 | 2.1 | 2.0 |
| 10 | 5.0 | 98.7 | 18.4 | Not enough sample | 0.2 |
| | With Fluorene | | | | |
| 11 | 0.1 | 0.2 | 18.3 | 19.4 | 18.3 |
| 12 | 0.5 | 1.9 | 18.4 | | 18.1 |
| 13 | 1.0 | 67.9 | 18.3 | 6.0 | 5.9 |
| 14 | 5.0 | 95.1 | 18.4 | Not enough sample | 0.9 |
| 15 | None (Control) | 0.9 | 18.6 | 22.7 | 18.5 |

As readily apparent from Table I, the molecular weight of the polymerized caprolactam was very close to the calculated value, especially when the moles of modifier per mole of sodium hydride was 0.5 or above. Thus, it is obvious to one skilled in the art that according to the concepts of the present invention, polymerized lactams can be produced having a molecular weight very close to the calculated value.

While in accordance with the patent statutes, the preferrred embodiments have been illustrated and described in detail, it is to be understood that the invention is not limited thereto, the scope of the invention being measured solely by the scope of the attached claims.

What is claimed is:

1. A molecular weight modified nylon, comprising: anionically polymerized lactam monomers having the formula

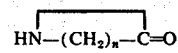

wherein n is from 2 to 15, and containing from 0.001 to about 30 mole percent based upon the lactam of a hydrocarbon compound lacking any active hydrogen attached to an atom selected from the group consisting of nitrogen, oxygen and sulfur, and having a McEwen-Streitwieser-Applequist-Dessy scale $pK_a$ of from about 15 to about 29.

2. A molecular weight modified nylon according to claim 1, wherein said amount of hydrocarbon is from about 0.005 to about 20 mole percent.

3. A molecular weight modified nylon according to claim 1, wherein said amount of hydrocarbon is from about 0.05 to about 1.0 mole percent.

4. A molecular weight modified nylon, comprising: anionically polymerized lactam monomers having the formula

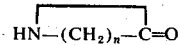

wherein $n$ is 5 to 12, and containing from about 0.001 to about 30 mole percent based upon the lactam of a hydrocarbon compound selected from the class consisting of fluorene, 9-phenylpropene, acetylene, phenylacetylene, indene, cyclopentadiene and 1,3,3-triphenylpropene.

5. A molecular weight modified nylon according to claim 4, wherein said hydrocarbon is selected from the group consisting of fluorene and phenylacetylene.

6. A molecular weight modified nylon according to claim 4, wherein said lactam has an $n$ value of 5.

7. A molecular weight modified nylon, comprising; anionically polymerized lactam monomers having the formula

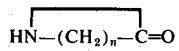

wherein $n$ is from 2 to 15, from about 0.01 to about 20 mole percent of an anionic initiator based on said lactam monomers, from 0.1 to about 20 equivalents based upon said initiator of a hydrocarbon compound lacking any active hydrogen attached to an atom selected from the group consisting of nitrogen, oxygen and sulfur, and having a Mc-Ewen-Streitwieser-Applequist-Dessy scale $pk_a$ of from about 15 to about 29, so that the modified molecular weight is similar to the expected calculated molecular weight.

8. A molecular weight modified nylon according to claim 7, wherein the amount of hydrocarbon compound is from about 0.5 to about 20 equivalents based upon said initiator.

9. A method for the preparation of nylons having modified molecular weights which comprises anionically polymerized lactams having the formula

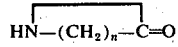

wherein $n$ is from 2 to 15, and carrying said polymerization out in the presence of from 0.001 to about 30 mole percent based upon the lactam of a hydrocarbon compound having a McEwen-Streitwieser-Applequist-Dessy scale $pK_a$ of from about 15 to about 29.

10. A method for the preparation of nylons having modified molecular weights according to claim 9 wherein said hydrocarbon compound range is from about 0.005 to about 20 mole percent.

11. A method for the preparation of nylons having modified molecular weights according to claim 9 wherein said hydrocarbon compound range is from about 00.5 to about 1.0 mole percent.

12. A method for the preparation of nylons having modified molecular weights which comprises an anionically polymerizing lactams having the formula

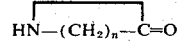

where $n$ is from 5 to 12, and containing from 0.001 to about 30 mole percent of the hydrocarbon compound selected from the class consisting of fluorene, 9-phenylfluorene, acetylene, phenylacetylene, indene, cyclopentadiene and 1,3,3-triphenylpropene.

13. A method for the preparation of nylons having modified molecular weights according to claim 12 wherein said hydrocarbons are selected from the group consisting of fluorene and phenylacetylene.

14. A method for the preparation of nylons having modified molecular weights according to claim 12, wherein said lactam monomer has an $n$ value of 5.

15. A method for the preparation of nylons having modified molecular weights according to claim 12, including the additional step of carrying said lactam polymerization out at a temperature of from 0°C to about 260°C.

16. A method for the preparation of nylons having modified molecular weights which comprises anionically polymerized lactams having the formula

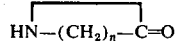

wherein $n$ is from 2 to 15, adding from about 0.01 to about 20 mole percent of anionic initiators based on said lactam monomers, adding from about 0.1 to about 20 equivalents based upon said initiator of a hydrocarbon compound lacking any active hydrogen attached to an atom selected from the group of nitrogen, oxygen and sulfur and having a McEwen-Streitwieser-Applequist-Dessy scale $pK_a$ of from about 15 to about 29, so that the modified molecular weight is similar to the expected calculated molecular weight.

17. A method for the preparation of nylons having modified molecular weights according to claim 16, wherein the amount of hydrocarbon compound is from about 0.5 to about 20 equivalents based upon said initiator.

18. A method for the preparation of nylons having modified molecular weights according to claim 16, including the additional step of carrying said lactam polymerization out at a temperature of from 0°C to 260°C.

19. A molecular weight modified nylon according to claim 12, wherein said amount of hydrocarbon is from about 0.005 to about 20 mole percent.

20. A molecular weight modified nylon according to claim 12, wherein said amount of hydrocarbon is from about 0.05 to about 1.0 mole percent.

21. A molecular weight modified nylon according to claim 19, wherein said hydrocarbon is selected from the group consisting of fluorene and phenylacetylene.

22. A molecular weight modified nylon according to claim 19, wherein said lactam has an $n$ value of 5 to 12.

23. A molecular weight modified nylon according to claim 22, wherein said $n$ value is 5.

24. A method for the preparation of nylons having modified molecular weights according to claim 12, wherein said hydrocarbon compound range is from 0.005 to about 20 mole per cent.

25. A method for the preparation of nylons having modified molecular weights according to claim 12, wherein said hydrocarbon compound range is from about 0.05 to about 1.0 mole per cent.

26. A method for the preparation of nylons having modified molecular weights according to claim 24, wherein said hydrocarbon is selected from the group consisting of fluorene and phenylacetylene.

27. A method for the preparation of nylons having modified molecular weights according to claim 24, wherein said lactam has an $n$ value of 5 to 12.

28. A method for the preparation of nylons having modified molecular weights according to claim 27, wherein said $n$ value is 5.

29. A method for the preparation of nylons having modified molecular weights, according to claim 9, including the additional step of carrying said lactam polymerization out at a temperature of from 0°C to about 260°C.

* * * * *

UNITED STATES PATENT OFFICE
CERTIFICATE OF CORRECTION

Patent No. 3,940,372  Dated February 24, 1976

Inventor(s) William L. Hergenrother

It is certified that error appears in the above-identified patent and that said Letters Patent are hereby corrected as shown below:

Column 1, line 34 "POlymer" should be -- Polymer --

Table I, column 6, Sample No. 10 under Expected heading "0.2" should read -- 0.24 --

Column 7, line 68 "00.5" should read -- 0.05 --

Signed and Sealed this

Fifth Day of April 1977

[SEAL]

Attest:

RUTH C. MASON
Attesting Officer

C. MARSHALL DANN
Commissioner of Patents and Trademarks